(12) United States Patent
Ono et al.

(10) Patent No.: US 7,096,848 B2
(45) Date of Patent: Aug. 29, 2006

(54) DIRECT INJECTION DIESEL ENGINE

(75) Inventors: Yutaka Ono, Oyama (JP); Tadashi Iijima, Oyama (JP); Masaki Takahashi, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/999,708

(22) Filed: Nov. 30, 2004

(65) Prior Publication Data

US 2005/0115538 A1  Jun. 2, 2005

(30) Foreign Application Priority Data

Dec. 1, 2003 (JP) .............................. 2003-401312

(51) Int. Cl.
F02B 3/00 (2006.01)
(52) U.S. Cl. .................... 123/294; 123/279; 123/193.6
(58) Field of Classification Search ................ 123/294, 123/298, 279, 276, 299, 193.6
See application file for complete search history.

(56) References Cited

U.S. PATENT DOCUMENTS

| | | | |
|---|---|---|---|
| 3,908,624 A * | 9/1975 | Miyake et al. ............... 123/262 |
| 4,721,080 A | 1/1988 | Moriyasu et al. | |
| 6,739,300 B1 * | 5/2004 | Ackermann et al. ...... 123/179.5 |
| 6,739,309 B1 * | 5/2004 | Hiraya et al. ................ 123/279 |
| 2003/0221658 A1 * | 12/2003 | Hiraya et al. ................ 123/279 |

FOREIGN PATENT DOCUMENTS

| | | |
|---|---|---|
| EP | 0 295 520 A3 | 12/1988 |
| JP | 58-183933 U | 12/1983 |
| JP | 05-071347 A | 3/1993 |
| JP | 2001-227345 A | 8/2001 |
| JP | 2001-227346 A | 8/2001 |

* cited by examiner

Primary Examiner—John T. Kwon
(74) Attorney, Agent, or Firm—Frishauf, Holtz, Goodman & Chick, P.C.

(57) ABSTRACT

A combustion chamber (20) opening toward a cylinder head (5) is provided on a top surface (11) of a piston (10), and this combustion chamber (20) comprises a first volume (22) having an inclined surface (20) and a second volume (23) further recessed from the first volume (22) toward a pin boss (13). Fuel spray F from a fuel injection nozzle (9) is injected toward an inner peripheral wall section (24) of the second volume (23) in a former stage of fuel injection and toward the inclined surface (21) of the first volume (22) in a later stage of fuel injection, and the percentage of the fuel injection period in the former stage against the total fuel injection period is set to the range from 40% to 70%.

13 Claims, 14 Drawing Sheets

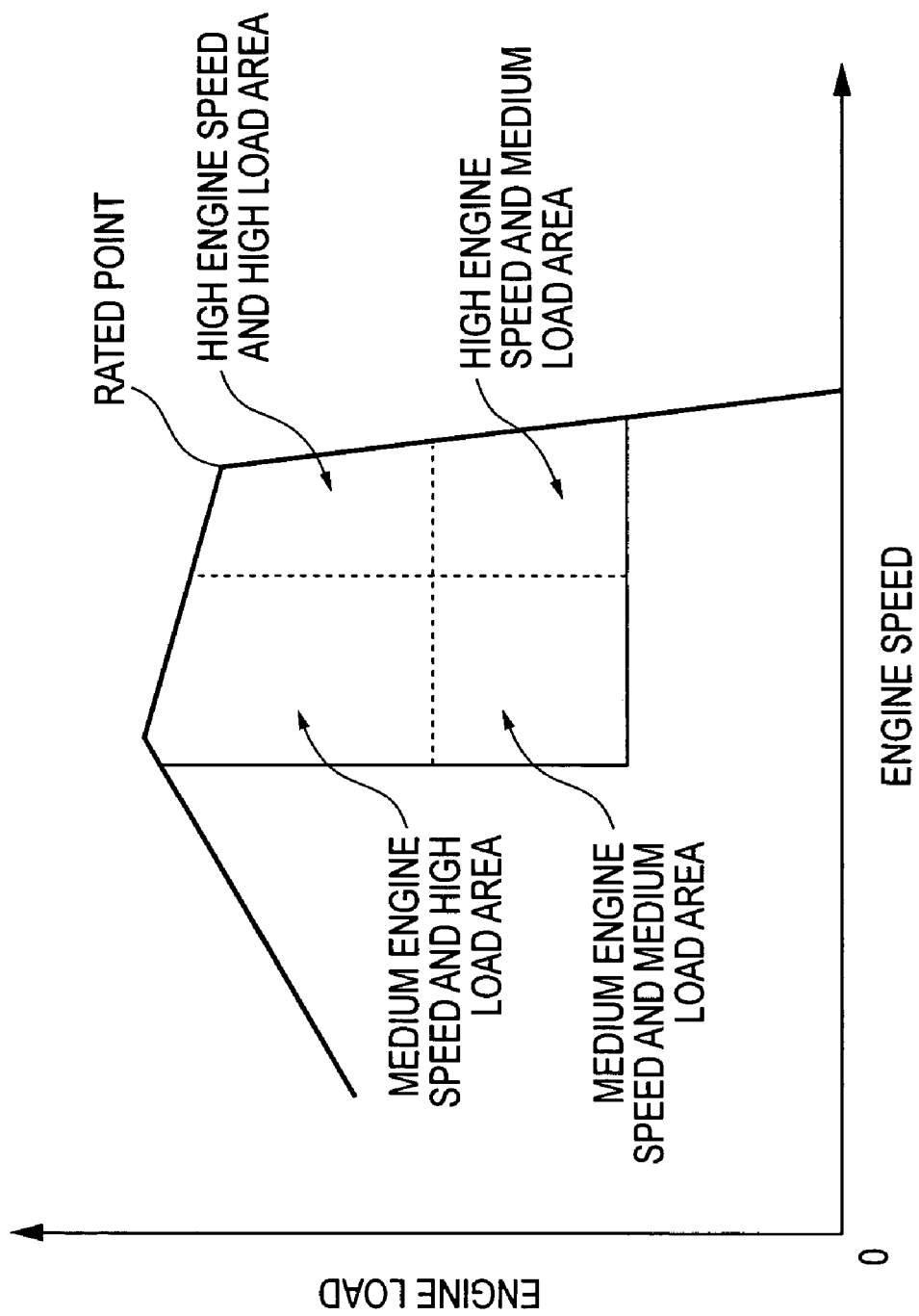

DIRECT INJECTION DIESEL ENGINE

BACKGROUND OF THE INVENTION

1. Field of the Invention

The present invention relates to direct injection diesel engines which inject fuel from a fuel injection nozzle provided on a cylinder head toward a combustion chamber provided on a piston top face section.

2. Description of Related Art

Various propositions have been made from the view points of, for instance, reduction of $NO_x$, reduction of smoke, and reduction of fuel consumption rate in relation to the shape of a combustion chamber provided on a piston top face section of a direct injection diesel engine as well as to the type of fuel injection (Refer to, for instance, Japanese Utility Model Laid-Open Publication No. SHO 58-183933).

According to the utility model described in the aforesaid document, the combustion chamber comprises a troidal in a lower section of the combustion chamber and an open chamber section in an upper section of the combustion chamber, and by vertical movement of the piston in association with rotation of an engine, after a half of fuel is injected and led into the troidal in the lower section thereof, the remaining half is continuously led into the open chamber in the upper section thereof, and the fuels are separately and homogeneously distributed in the combustion chamber for the purpose of reducing both $NO_x$ and smoke simultaneously, as well as reducing the fuel consumption rate.

However, the fuel injection amount (namely the fuel injection period) should generally be changed according to the engine speed or the load of engine, and, consequently, the fuel injection timing (namely timing for start of injection) also should be changed.

With the disclosure in the document above, however, the fuel injection period is kept constant, and the ratio of fuel injection period is controlled only by incorporating a edge radius of a border section between a troidal and an open chamber each constituting a combustion chamber to a prespecified value. Therefore, in the document above, when a fuel injection period is largely changed, it is impossible to accurately distribute a half of the fuel to the troidal and a remaining half of the fuel to the open chamber, so that the effect in emission control and the effect in reduction of fuel consumption rate can hardly be expected.

Especially, in a case of an engine used for construction machines, a engine speed and the engine load are often largely changed, so that the capability of accurate fuel injection control in the situation as described above is desired.

SUMMARY OF THE INVENTION

A main object of the present invention is to provide a direct injection diesel engine capable of suppressing $NO_x$ generation, reducing smoke, and also reducing fuel consumption rate.

An aspect of the present invention is to provide a direct injection diesel engine that comprises a combustion chamber provided on a top face of a piston and opening toward a cylinder head, and a fuel injection nozzle provided on the cylinder head for injecting fuel toward the combustion chamber, wherein the combustion chamber has a first volume having a circular periphery forming the opening and recessed from the top face toward a pin boss, and a second volume provided at a center of the first volume and further recessed toward the pin boss than the first volume, and wherein the fuel injection from the fuel injection nozzle is continuously performed into the second volume and then into the first volume in association with movement of the piston, and further, in at least a part of the engine running period, the injection period from start of injection until reaching a border section between the first volume and the second volume is set to a range 40% to 70% against the total fuel injection period by controlling the fuel injection timing according to the engine speed and/or the engine load.

Another aspect of the present invention is to provide a direct injection diesel engine that comprises a combustion chamber provided on a top face of a piston 10 and opening toward a cylinder head, and a fuel injection nozzle provided on the cylinder head for injecting fuel toward the combustion chamber, wherein the combustion chamber has a first volume having a circular periphery forming the opening and recessed from the top face toward a pin boss, and a second volume provided at a center of the first volume and further recessed toward the pin boss with respect to the first volume, and wherein the fuel injection from the fuel injection nozzle is performed as primary fuel injection toward an inner peripheral wall section of the second volume, and then is performed as secondary fuel injection separatery from the primary fuel injection toward a bottom surface of the first volume.

In the above configurations, since the combustion chamber is constituted by a first volume and a second volume, when the compression ratio is identical to that of the conventional combustion chamber, such as a reentrant type, the capacity of the second volume may be smaller than that of the combustion chamber of a reentrant type.

As a result, in the former stage of fuel injection (or the first fuel injection, the same is applied hereinafter) where the fuel is injected toward the inner peripheral wall section of the second volume, since the fuel spray impinges the inner peripheral wall section of the second volume in a short distance, and the amount of air inside the first volume 23 is small, combustion is restricted and thereby the combustion temperature is lowered. Accordingly, the amount of the $NO_x$, which will be large with the conventional technology, can be substantially reduced.

On the other hand, in the later stage of fuel injection (or the second fuel injection, the same is applied hereinafter), since the piston goes down, the fuel spray is injected toward bottom surface of the first volume, therefore the fresh air existing within the space defined by the bottom surface of the cylinder head, the top face of the piston and the inclined surface can be used. Accordingly, the combustion is performed actively and generation of PM (particulate matter) can be suppressed, and further the portion of fuel incompletely burnt in the second volume during the former stage of fuel combustion can further be oxidized, so that PM, smoke and the fuel consumption rate can further be reduced.

Further, even when the fuel injection amount is changed according to the engine speed and the engine load, since the percentage of the fuel injection period in the former stage of fuel injection is set to 40% to 70% of the total fuel injection period by controlling the fuel injection timing with the control unit, or since the first fuel injection and the second fuel injection are made sure to perform separately from each other, it is possible to consistently control the fuel injection amount into the first volume and that into the second volume, so that distribution of fuel in the combustion chamber can be performed more accurately with emissions and the fuel consumption rate reduced more efficiently.

Consequently, in the later stage of combustion, although the combustion becomes active, and thereby the $NO_x$ will, more or less, increase, the total amount of $NO_x$ produced by both former stage and later stage of combustion can be kept low. Further, the control of the fuel injection timing can be achieved by employing a recent common rail, a controller for controlling fuel injection, or the like.

In order to get a constant compression ratio, if the first volume is formed to have a circular shape by forming the first volume while the shape the second volume is formed, due to the small internal diameter of the first volume (namely, the opening diameter), the fuel spray will impinge the top face of the piston in the later stage of combustion. Further, since the flow of the fuel spray become easy to adhere on the cylinder liner, the oil will be deteriorated due to the carbonized fuel mixed in the oil.

In the aforesaid direct injection diesel engine, it is preferred that the bottom surface of the first volume is formed with an inclined face becoming gradually deeper toward the pin boss from a position near an external periphery section of the piston to the center of the piston.

According to the above configuration, since the bottom surface of the first volume is formed to have a gently inclined face, the diameter of the opening formed on the top (namely, the internal diameter of the first volume) widely extends toward the vicinity of the external periphery section of the piston, the injection of the fuel spray can be securely performed in the first volume to confirm that the fuel is combusted in the first volume. As a result, the generation of the PM can be reduced due to the active combustion, and the portion of fuel incompletely burnt in the second volume during the former stage of fuel combustion can further be oxidized, so that amount of generated PM and smoke and the fuel consumption rate can further be reduced.

In the aforesaid direct injection diesel engine, it is preferred that, on a bottom surface of the second volume, a conical section is formed with an inclined surface section becoming gradually higher inwardly from the inner peripheral wall section toward the top face.

According to the above configuration, since the a conical section is formed to the bottom surface of the second volume, the space not substantially involved in combustion is reduced, so that PM, smoke, and a fuel consumption rate can be reduced.

In the aforesaid direct injection diesel engine, it is preferred that the ratio of an internal diameter of the second volume against an external diameter of the piston is in the range from 0.4 to 0.6, and the ratio of an internal diameter of the first volume against the internal diameter of the second volume is in the range from 1.3 to 2.0.

Herein, the internal diameter of the first volume is the diameter of the opening facing toward the cylinder head.

According to the above configuration, by setting the ratio of the internal diameter of the second volume against the external diameter of the piston and the ratio of the internal diameter of the first volume against the internal diameter of the second volume to optimal values, it is possible to divide the capacity of the combustion chamber into the first volume and the second volume each having the optimal capacity, and therefore the fuel injected into each of the volumes can be burnt efficiently.

In the aforesaid direct injection diesel engine, it is preferred that the radius of the edge formed on the border between the first volume and the second volume is 3% of the external diameter of the piston or less.

Herein, the radius of the edge is a specified curvature radius into which the ridge portions are rounded when machining metal, the curvature radius being specified on the design drawing.

According to the above configuration, since the radius of the edge formed at the border section between the first volume and the second volume is set smaller than a predetermined value, the injected fuel is made sure to be distributed into either one of the first volume and the second volume, instead of being distributed unevenly into either one of the first volume and the second volume, the PM and smoke can be reduced.

BRIEF DESCRIPTION OF THE DRAWINGS

FIG. 4 is a view showing a relation between the engine speed and the engine load;

DETAILED DESCRIPTION OF PREFERRED EMBODIMENT(S)

A first embodiment of the present invention is described below with reference to the related drawings.

Figure 1:
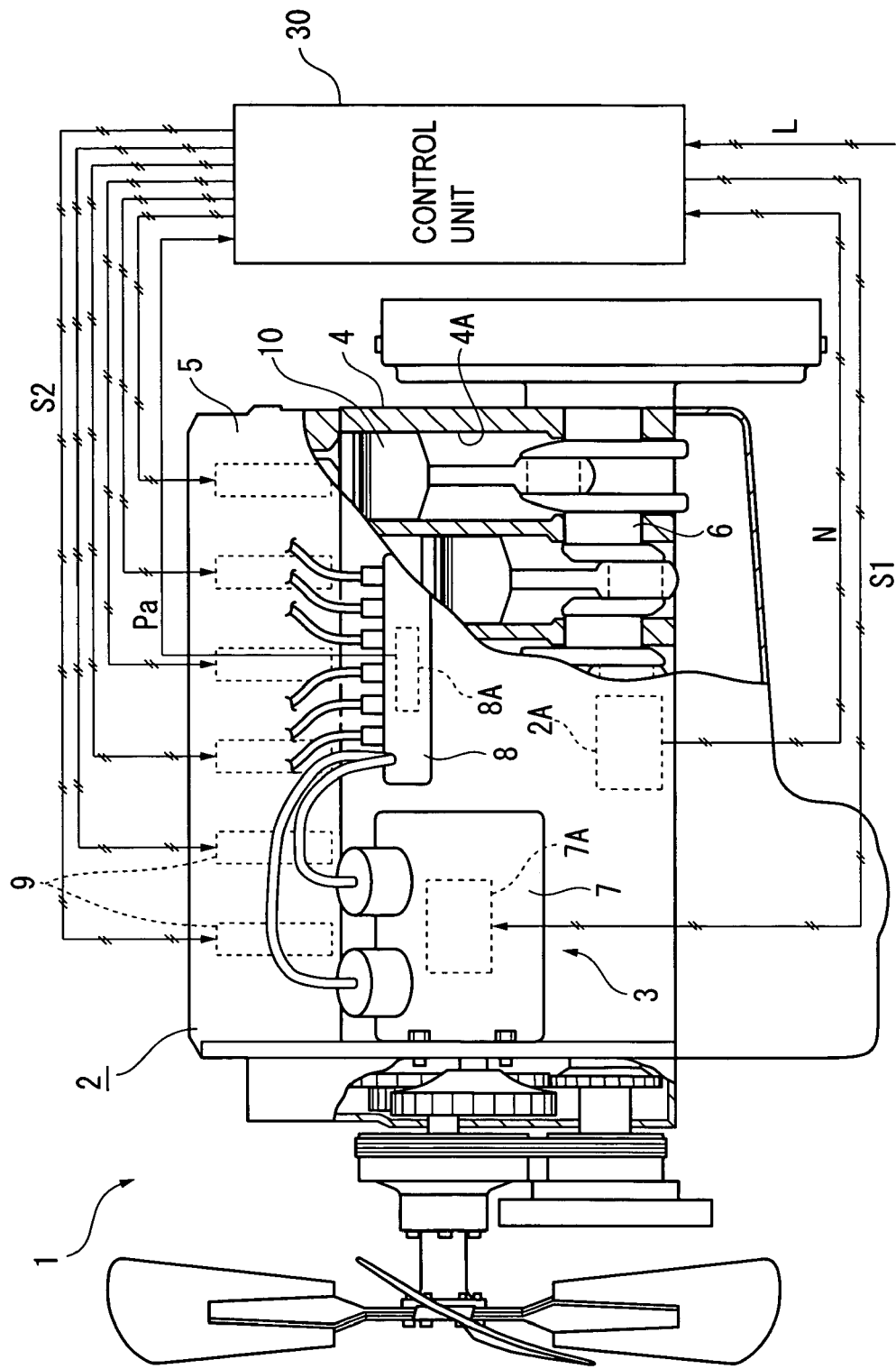
FIG. 1 is a partial cross-sectional view showing a direct injection diesel engine according to a first embodiment of the present invention.

FIG. 1 is a partial cross-sectional view showing a direct injection diesel engine 1 according to a first embodiment of the present invention. In this FIG. 1, the diesel engine 1 is used for driving various types of construction machines such as a dump truck, a bulldozer, a hydraulic shovel, and a wheel loader, or a large size generator, and comprises an engine body 2 and a fuel injector 3 for feeding fuel to the engine body 2.

The engine body 2 comprises a cylinder block with a plurality of cylinders 4A formed therein, a cylinder head 5 bolted or otherwise fixed in an upper section of the cylinder block 4, a plurality of pistons 10 reciprocally moving within the plurality of cylinders 4A under a pressure by combustion gas burnt in each of the cylinders 4A, and a crank shaft 6 for converting reciprocal movement of the piston 10 to rotational movement.

The fuel injector 3 comprises a high pressure supply pump 7 for pressurizing and feeding fuel under a high pressure, a common rail 8 for accumulating the highly pressurized fuel thereon, and a fuel injection nozzle 9 for injecting the fuel from the common rail 8 into each of the cylinders 4A. The high pressure supply pump 7 and the common rail 8 are attached to an external wall of the cylinder block, while the fuel injection nozzle 9 is placed in the cylinder head 5. The fuel injector 3 having the configuration as described above is controlled by a control unit 30 described hereinafter.

The piston 10 in the diesel engine 1 is described below in detail with reference to the side cross-sectional view shown in FIG. 2.

Figure 2:
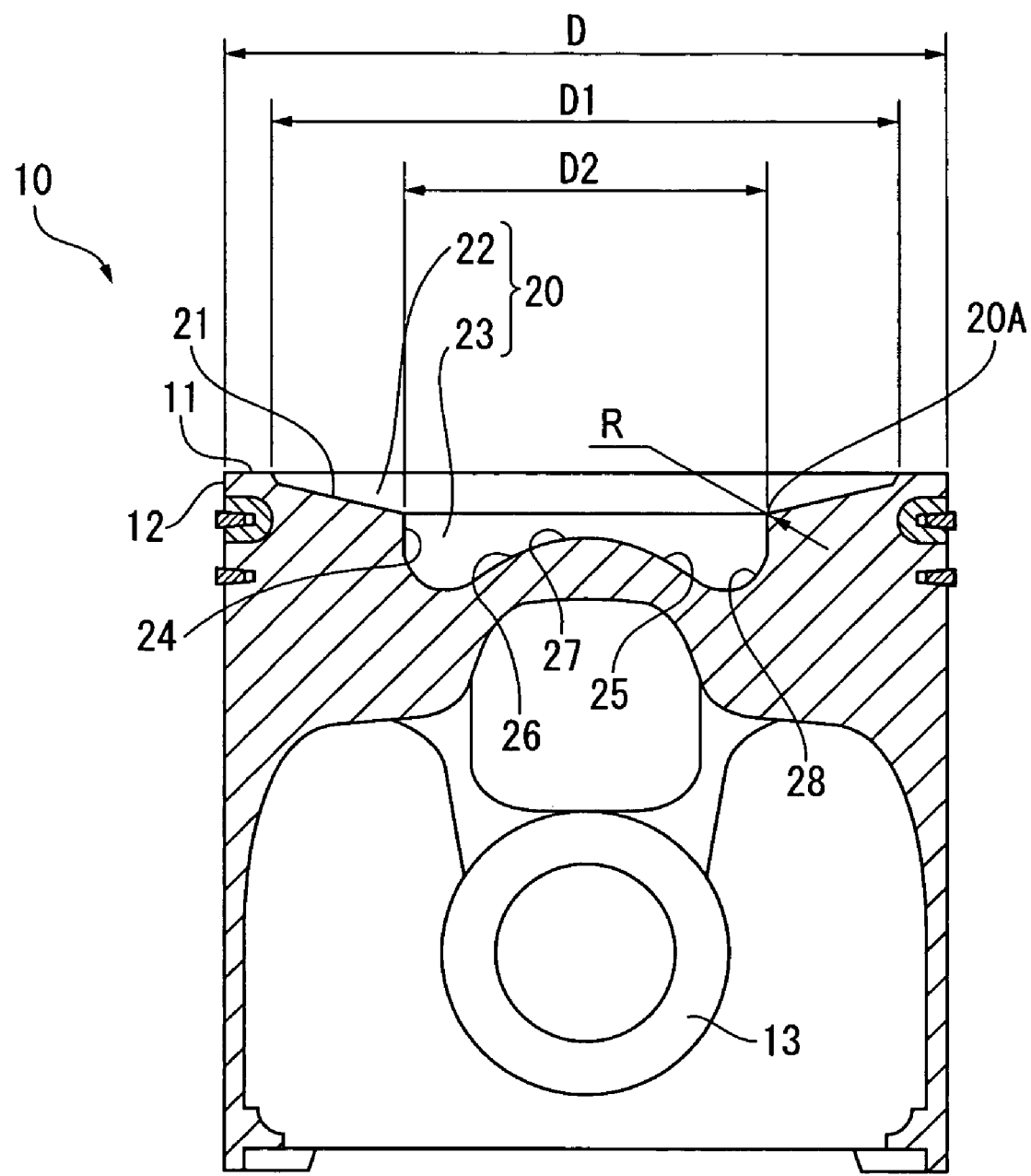
FIG. 2 is a side cross-sectional view showing a piston according to the first embodiment.

In FIG. 2, a combustion chamber 20 is provided on a top face 111 of the piston 10 and opened with a circular shape when viewed from the top toward the cylinder head 5. The combustion chamber 20 comprises a first volume 22 having an inclined surface continued to a circular periphery of the opening, and a second volume 23 having a circular shape when viewed from the top provided at a center of the first volume 22 and further recessed toward a pin boss 13 as compared to the first volume 22. In the combustion chamber 20 having the configuration as described above, when the compression ratio is identical to that in the conventional technology, the capacity of the second volume 23 may be smaller, for instance, than that of a combustion chamber in the reentrant type combustion chamber based on the conventional technology.

The inclined surface 21 of the first volume 22 has a shape becoming gradually deeper toward the pin boss 13 from a position near an external periphery section 12 of the piston 10 to the center of the piston 10.

The second volume 23 has a vertical inner peripheral wall section 24, and on a bottom surface of the second volume 23, a conical section 26 is formed with an inclined surface section 25 becoming gradually higher as it goes inner in the radial direction from the inner peripheral wall section 24 toward the top face 11, and a top surface of the conical section 26 is formed with a projected first curved surface section 27, and further the inner peripheral wall section 24 and the inclined surface section 25 are connected to each other with a recessed second curved surface section 28. Because this conical section 26 is provided, a space not substantially involved in fuel combustion is reduced so that PM, smoke, and a fuel consumption rate can be reduced.

A total capacity of the combustion chamber 20 is the same as that of a combustion chamber in the reentrant type. Therefore, the internal diameter D2 of the second volume 23 is smaller than that of a combustion chamber in the conventional technology, and also the capacity is smaller. Further the ratio of the internal diameter D2 of the second volume 23 against an external diameter D of the piston is in the range from 0.4 to 0.6, while the ratio of an internal diameter D1 of the first volume 22 against the internal diameter D2 of the second volume 23 is in the range from 1.3 to 2.0. By setting the ratio of the internal diameter D2 of the second volume 23 against the external diameter D of the piston and the ratio of the internal diameter D1 of the first volume 22 against the internal diameter D2 of the second volume 23 to optimal values respectively as described above, it is possible to divide a capacity of the combustion chamber to the first volume 22 and the second volume 23 each having the optimal capacity, and therefore the fuel injected into each of the volumes 22 and 23 can be burnt efficiently. It is to be noted that the internal diameter of the first volume 22 as used herein indicates a bore of the opening facing toward the cylinder head 5.

Further the radius R of an edge formed at a border section 20A between the first volume 22 and the second volume 23 is not more than 3% of the external diameter D of the piston. When the radius is larger than 3% of the external diameter D of the piston, the fuel injected to the border section 20A is distributed unevenly into either one of the first volume 22 and the second volume 23, and so that quantities of generated PM and smoke increase. By controlling the radius under 3% of the external diameter D of the piston or below, it is possible to promote PM and smoke reduction.

Next, the control unit 30 is described with reference to FIG. 1.

The control unit 30 comprises an MPU and other components, and controls the timing of opening and closing a discharge rate control electromagnetic valve 7A of the supply pump 7 by feeding back a real pressure Pa of the fuel accumulated on the common rail 8 from a pressure sensor 8A and outputting a open/close signal S1 to the discharge rate control electromagnetic valve 7A so that the real pressure Pa becomes the optimal rail pressure preset according to the engine speed and the load of the diesel engine 1. Further in relation to fuel injection, the control unit 30 controls the fuel injection from the fuel injection nozzle 9 by outputting a control pulse S2 to an electromagnetic valve (not shown) of the fuel injection nozzle 9 according to the fuel injection timing (timing for start of fuel injection) and the fuel injection period (the fuel injection amount) preset according to the engine speed and the load of the diesel engine 1. Because of the feature, a engine speed signal N from a speed sensor 2A is inputted into the control unit 30 for detecting the engine speed of the diesel engine 1, and also an opening signal L from an accelerator pedal, a fuel injection amount setting dial or the like is inputted thereto for detecting the engine load.

The fuel injection system according to this embodiment is described below.

Fuel injection is started at the last stage of a compression stroke of a piston. In the following description, the stage from start of fuel injection into the second volume 23 until a center of the fuel spray arrives at the border section 20A is called as a former stage of fuel injection and the stage from arrival of the center of fuel spray at the border section 20A until end of fuel injection is called as a latter stage of fuel injection as shown in FIG. 2, and in the former stage of fuel injection, the fuel spray F of the fuel injected from the fuel injection nozzle 9 collides the inner peripheral wall section 24 of the second volume 23. Therefore, most of the fuel is supplied into and burnt in the second volume 23. In this step, as a quantity of air inside the second volume 23 is smaller than that in the conventional technology, combustion of the fuel inside the second volume 23 is restricted, so that the combustion temperature is lowered with generated $NO_x$ being substantially reduced.

Figure 3A:
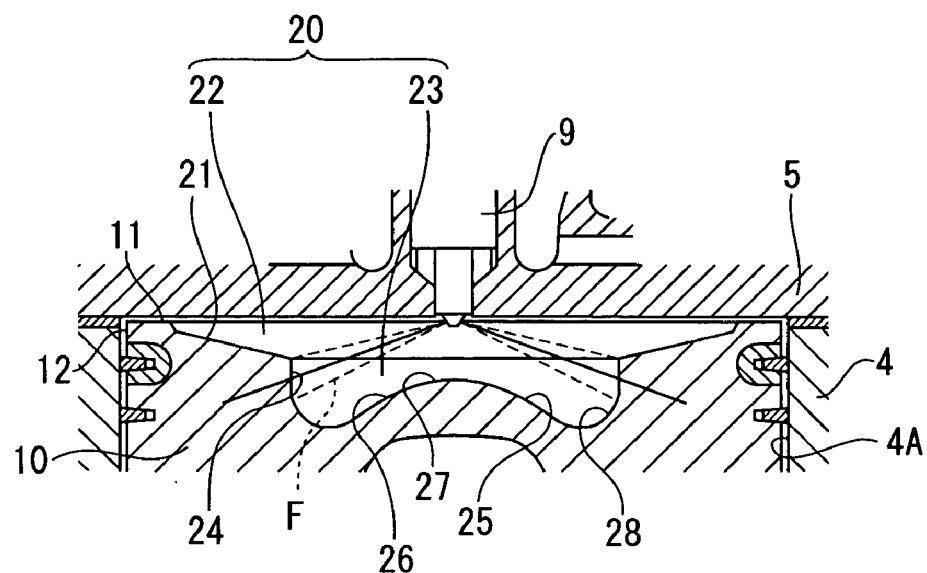
FIG. 3A and FIG. 3B are views each illustrating a combustion system in the first embodiment.
Figure 3B:
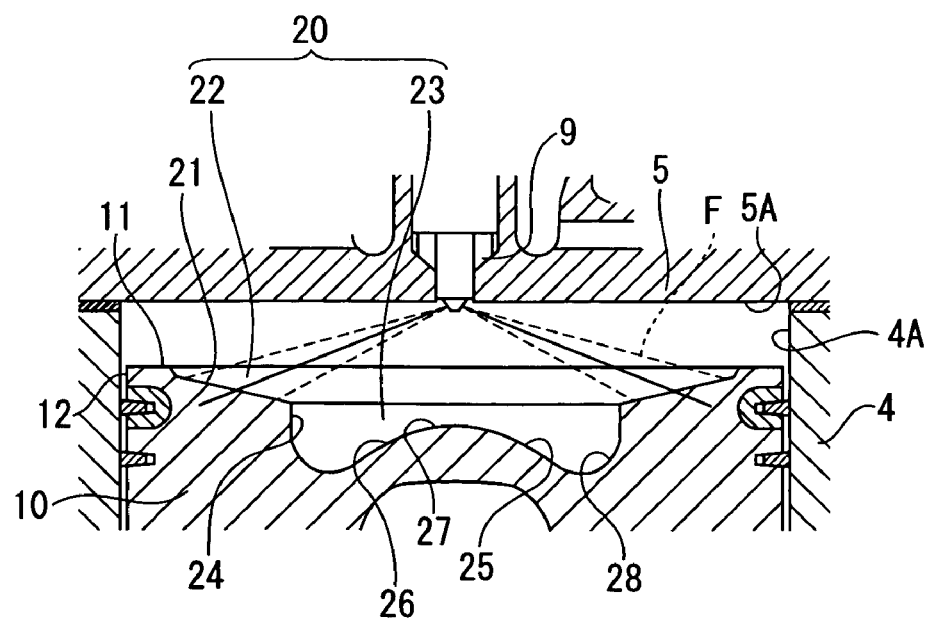

In the later stage of fuel injection shown in FIG. 3B, the piston 10 goes down, and in association with the downward movement of the piston, the fuel spray F is injected toward the inclined surface 21 of the first volume 22. In this step, the fuel spray F is continuously injected in succession to that in the feeding stage into the second volume 23. Because of this feature, the fuel is mixed with fresh air existing within the first volume 22 as well as the space defined by a bottom surface 5A of the cylinder head 5, the top face 11 of the piston 10 and the inclined surface 21, and is burnt completely. Therefore the combustion is performed actively and generation of PM can be suppressed. Further the portion of the fuel incompletely burnt in the former stage of fuel combustion and remaining therein is completely burnt together with the fuel supplied in the later stage of fuel injection. Because of the configuration, quantities of generated PM and smoke and the fuel consumption rate can substantially be reduced. In addition, the external periphery side of the inclined surface 21 extends up to an area near the external periphery section 12 of the piston 10, so that the fuel spray F in the later stage of fuel injection can securely be fed into the first volume 22 and the fuel can completely be burnt in the first volume 22. Because of this feature, the fuel combustion becomes more active with a quantity of generated PM further reduced, and further the portion of fuel incompletely burnt in the second volume 23 during the former stage of fuel combustion can further be oxidized, so that generated PM and smoke and the fuel consumption can further be reduced.

Further in this embodiment, the fuel injection period in the former stage of fuel injection is set to a range from 40% to 70% of the total fuel injection period by controlling the fuel injection timing according to a engine speed and load of the diesel engine 1 with the control unit 30.

Namely as shown in FIG. 4, when the running state of the diesel engine 1 is in any of the high engine speed and high load area, high engine speed and medium load area, medium engine speed and high load area, and medium engine speed and medium load area, the fuel injection period in the former stage of fuel injection is set to a range from 40% to 70% of the total fuel injection period. More specifically, when the engine speed is medium or more and the load is medium, such as the operation of "high engine speed and medium load area" or the operation of "medium engine speed and medium load area", the fuel injection period in the former stage of fuel injection is set to a range from 40% to 65% of the total fuel injection period, and when the engine speed is medium or higher and a load is high, such as the operation of "high engine speed and high load area" or the operation of "medium engine speed and high load area", the fuel injection period in the former stage of fuel injection is set to a range from 50% to 70% of the total fuel injection period.

The medium engine speed as used herein indicates an engine speed equivalent to about 60% to 75% of the rated engine speed, while the high engine speed as used herein indicates an engine speed higher than the medium engine speed. The high load includes the rated load as well as a load with prespecified ranges higher and lower than the rated load, while the medium load includes a load equivalent to 50% of the rated load and a load with prespecified ranges higher and lower than the rated load.

Figure 5:
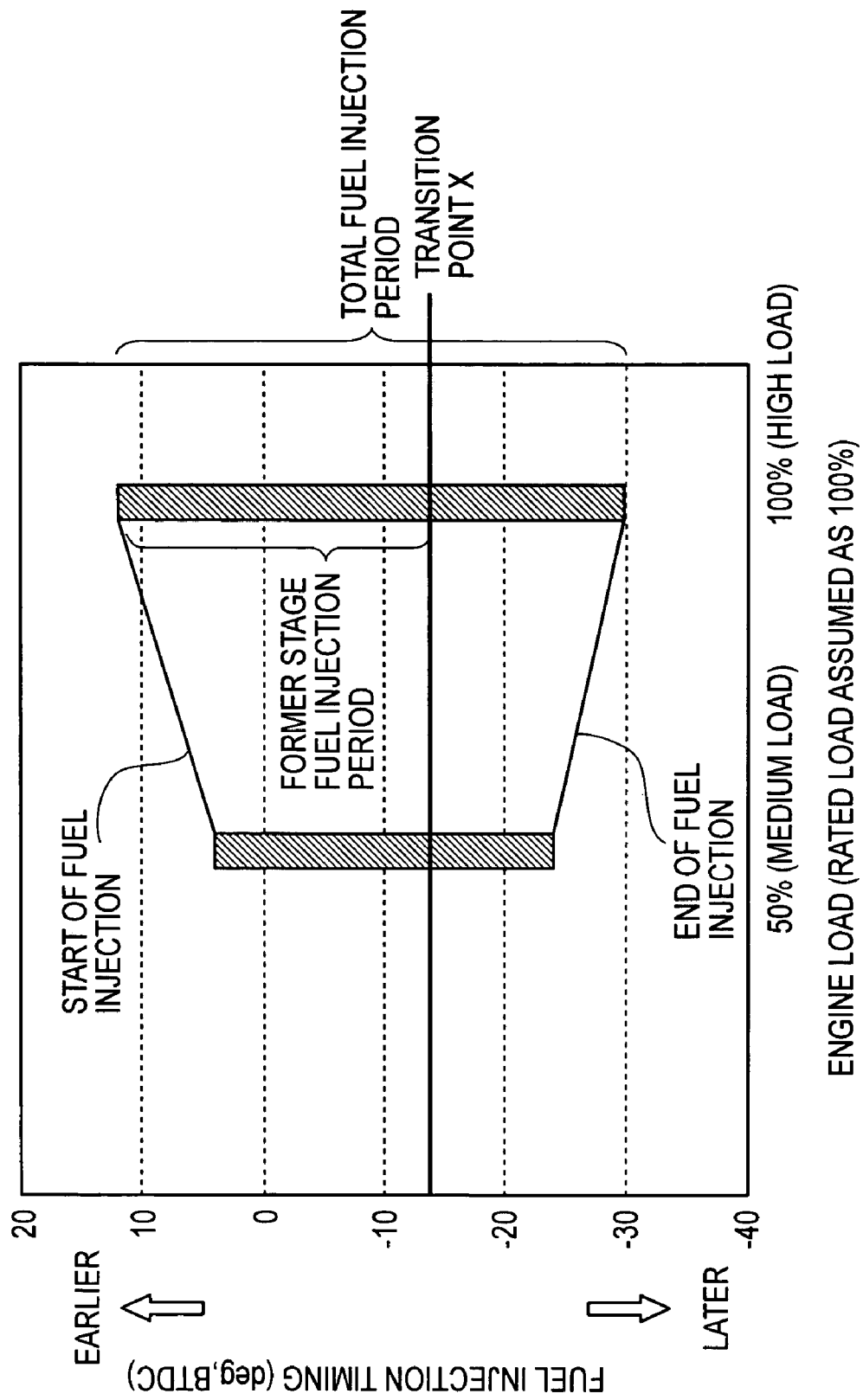
FIG. 5 is a view showing a relation between the engine load and the fuel injection period.

FIG. 5 shows a relation between the engine load and the fuel injection timing (timing for start of fuel injection). As clearly shown in this figure, to keep the ratio of the fuel injection period in the former stage against the total fuel injection period in the range from 40% to 70%, it is required to change the fuel injection amount in correspondence to the engine load, and therefore it is also necessary to change the timing for start of fuel injection in correspondence to the engine load. Namely in the state where the engine is run under a medium load, as the fuel injection amount is small, so that, assuming the border section 20A shown in FIG. 2 as a transition point X, it is necessary to start fuel injection in the former stage at a later point of time before the fuel spray reaches this transition point X, and also to terminate fuel injection in the later stage at an earlier point of time. On the other hand, when the engine is running under a high load, the fuel injection amount is high, so that it is necessary to start the fuel injection at an earlier point of time in the former stage and also to terminate the fuel injection at a later point of time in the later stage.

Figure 6:
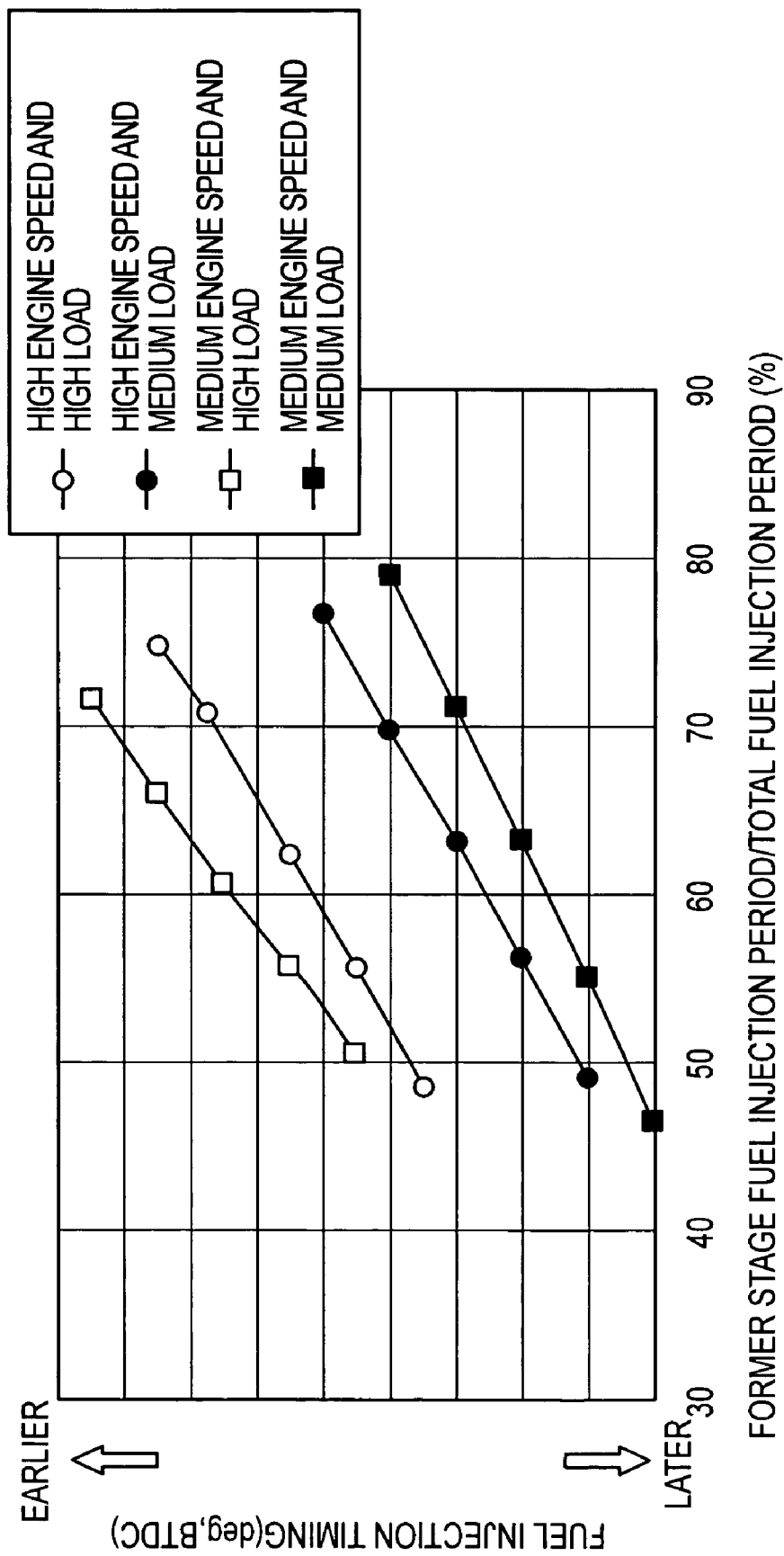
FIG. 6 is a view showing a relation between the percentage of former stage fuel injection period against total injection period and the fuel injection timing.

FIG. 6 shows the timing for start of fuel injection corresponding to the ratio of the fuel injection period in the former stage against the total fuel injection period for each of the running conditions required for satisfying the needs as described above. In this figure, the "high engine speed and high load", which varies depending on the size and performance of the diesel engine, corresponds, for instance, to a case where the engine speed is 2000 rpm and the engine load is 100% of the rated load. The "high engine speed and medium load" corresponds, for instance, to a case where the engine speed is 2000 rpm and the engine load is 50% of the rated load. The medium engine speed and high load corresponds, for instance, to a case where the engine speed is 1400 rpm and the engine load is a full load (100% of the rated load), and the medium engine speed and medium load corresponds, for instance, to the engine speed is 1400 rpm and the engine load is 50% of the full load. As understood from FIG. 5, to keep the ratio of a fuel injection period in the former stage against the total fuel injection period within the range from 40% to 70%, it is required to start fuel injection at an earlier point of time under a high engine load and at a later point of time under a medium engine load.

Figure 7:
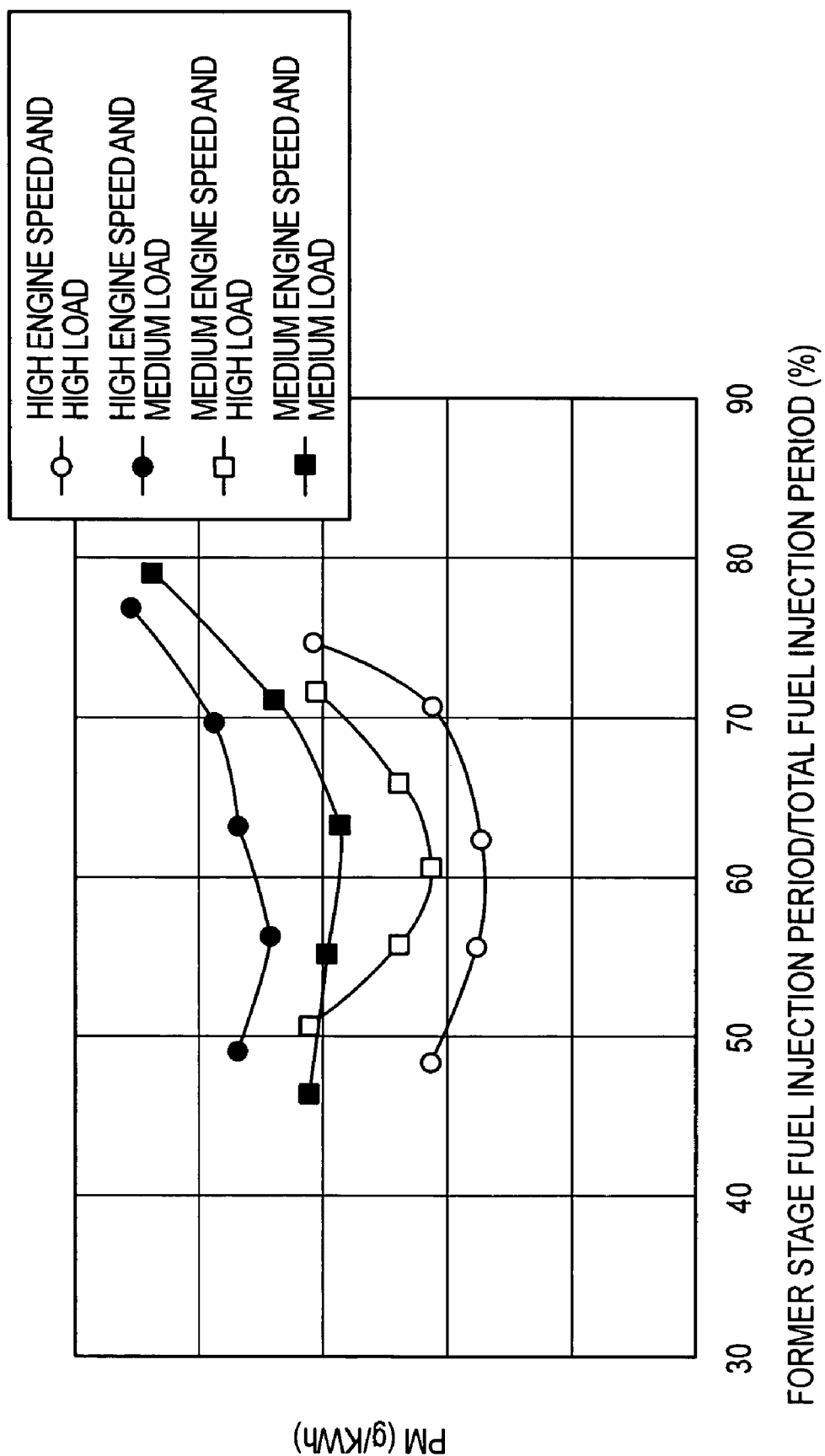
FIG. 7 is a view showing a relation between the percentage of former stage fuel injection period against total fuel injection period and the quantity of generated PM.

FIG. 7 shows a quantity of generated PM in each running state. From this figure, it can be understood that the quantity of generated PM under a low load is larger as compared to that under a high load, and the reason is presumably that, when the engine load is low, a quantity of injected fuel is small and therefore the combustion temperature is low. However, the quantity of generated PM shown in FIG. 7 is substantially smaller as compared to that in the conventional technology.

When the engine load is low, if the percentage of the fuel injection period in the former stage against the total fuel injection period is over 70%, the quantity of generated PM increases, but when the percentage is around 50%, the increase rate is small. Under a high engine load, when the percentage of the fuel injection period in the former stage against the total fuel injection period is around 60%, the quantity of generated PM is remarkably small. Therefore, as described above, at the percentage in the range from 40% to 70%, especially when the engine load is medium, it is desirable to set the fuel injection period in the former stage to 40% to 65% of the total fuel injection period, and when the load is high, it is desirable to set the fuel injection period in the former stage to 50% to 70% of the total fuel injection period.

Figure 8:
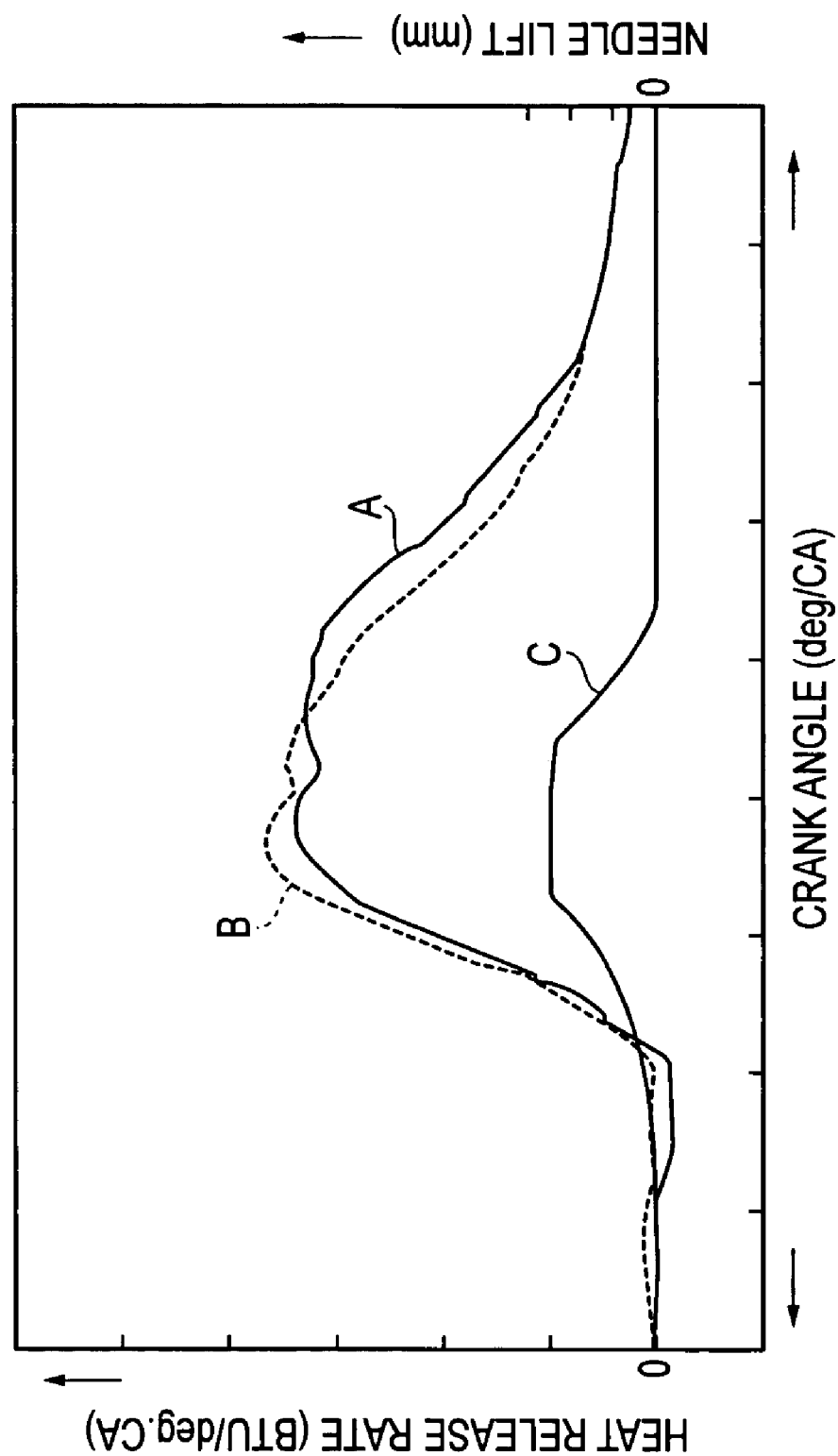
FIG. 8 is a view showing a comparison between a rate of heat release in a cylinder in the combustion system according to the first embodiment and that in the conventional combustion system.

FIG. 8 is a view showing a comparison between a rate of heat release in a cylinder during combustion in the conventional combustion system and that in the combustion system according to this embodiment. In FIG. 8, the vertical axis indicates a rate of heat release in a cylinder, while the horizontal axis indicates a crank angle, and the curve A shown with a solid line indicates a rate of heat release in the combustion system according to this embodiment, the curve B shown with a dashed line indicates that in the conventional combustion system, and the curve C indicates a needle upward movement rate of the fuel injection nozzle 9. As clearly understood from the figure, in the initial stage of combustion, the rate of heat release in a cylinder in the combustion system according to this embodiment is lower as compared to that in the conventional combustion system. This means that a quantity of exhausted $NO_x$ is small. In the later stage of combustion, combustion is performed sufficiently, and quantities of generated PM and smoke and the fuel consumption rate are substantially reduced. In the later stage of combustion, there is a portion in which the curve A is higher than the curve B and a rate of heat release in a cylinder in the combustion system according to this embodiment is higher, and a quantity of exhausted $NO_x$ increases more as compared to that in the conventional technology, but the total quantity is substantially identical. Namely a quantity of exhausted $NO_x$ is suppressed with the quantities of generated PM and smoke and the fuel combustion rate reduced.

As described above, even when a fuel injection amount is changed according to the engine speed of and the engine load, since the percentage of the fuel injection period in the former stage of fuel injection is set to 40% to 70% of the total fuel injection period by controlling the timing for start of fuel injection with the control unit 30, it is possible to always stabilize the fuel injection amount into the first volume 22 and that into the second volume 23, so that distribution of fuel in the combustion chamber 20 can be performed more securely with emissions and the fuel consumption rate being reduced more efficiently. Therefore, the diesel engine 1 according to this embodiment can advantageously be applied to construction machines or the like in which the engine speed and the load frequently change.

Figure 9:
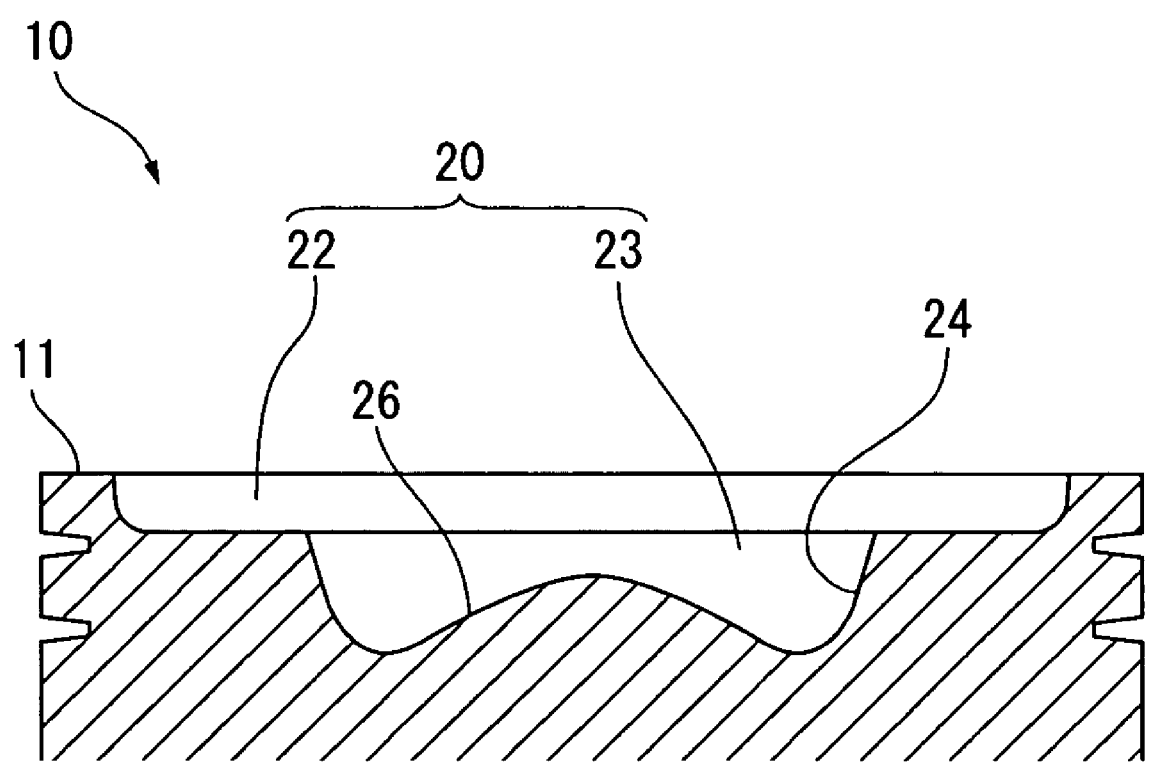
FIG. 9 is a side cross-sectional view showing the shape of a combustion chamber according to a second embodiment of the present invention.

FIG. 9 is a side cross-sectional view showing the shape of the combustion chamber 20 according to a second embodiment of the present invention.

Provided on the top face 11 of the piston 10 is the first volume 22 having a bottom surface substantially parallel to the top face 11 and having a recessed section with a prespecified depth, and further the second volume 23 having a circular shape when viewed from the top and also having a recessed cross section is provided at a center of the bottom surface. The inner peripheral wall section 24 of the second volume 23 inclines and purses toward the bottom. The conical section 26 is provided on a bottom surface of the second volume 23 like in the first embodiment.

Figure 10:
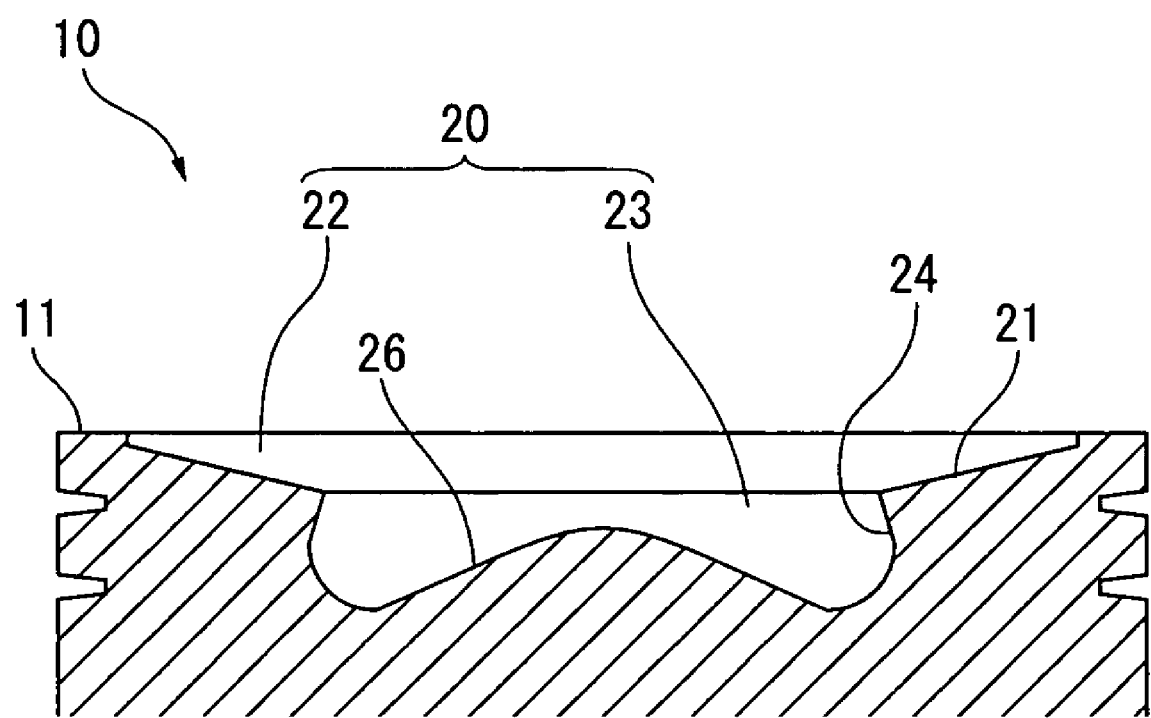
FIG. 10 is a side cross-sectional view showing the shape of a combustion chamber according to a third embodiment of the present invention.

FIG. 10 is a side cross-sectional view showing the shape of the combustion chamber 20 according to a third embodiment of the present invention.

This embodiment is different from the first embodiment in the point that the inner peripheral wall section 24 of the second volume 23 inclines and widens toward the bottom. Other portions have the same shape as those in the first embodiment.

Figure 11:
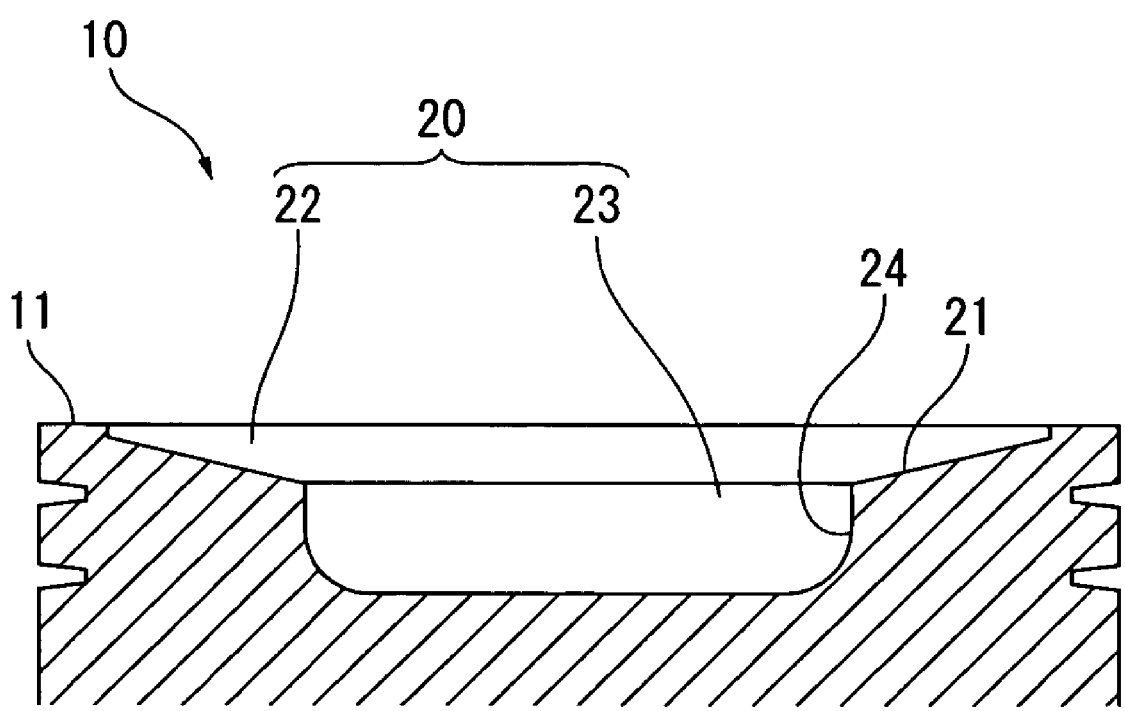
FIG. 11 is a side cross-sectional view showing the shape of a combustion chamber according to a fourth embodiment of the present invention.

FIG. 11 is a side cross-sectional view showing a form of the combustion chamber 20 according to a fourth embodiment of the present invention.

This embodiment is different from the first embodiment in the point that a bottom surface of the second volume 23 is flat. Other portions have the same shape as those in the first embodiment.

Figure 12:
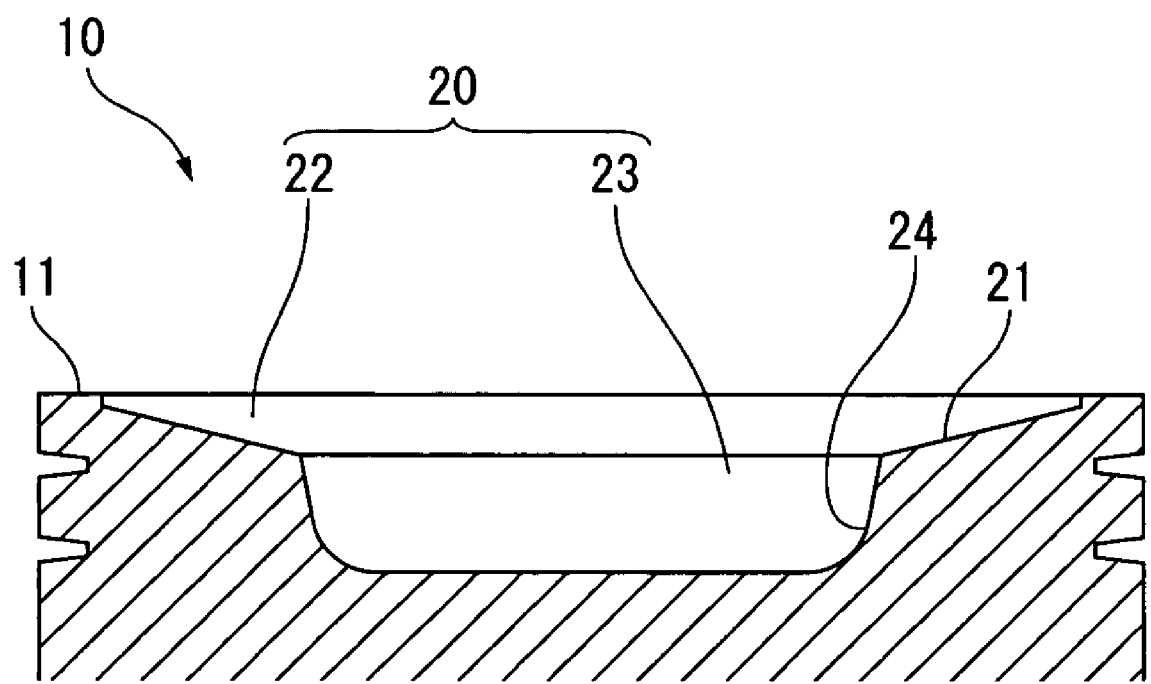
FIG. 12 is a side cross-sectional view showing the shape of a combustion chamber according to a fifth embodiment of the present invention.

In the combustion chamber 20 according to a fifth embodiment of the present invention as shown in FIG. 12, the inner peripheral wall section 24 of the second volume 23 inclines and purses toward the bottom, and the fifth embodiment is different from the fourth embodiment in this point.

Figure 13:
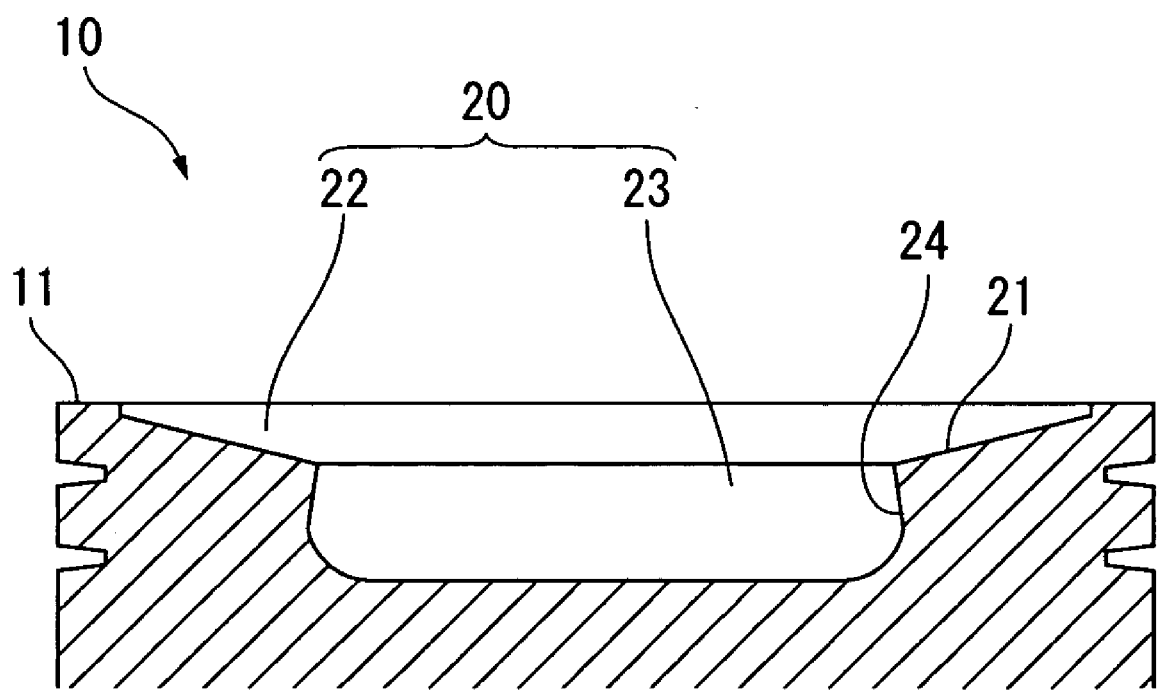
FIG. 13 is a side cross-sectional view showing the shape of a combustion chamber according to a sixth embodiment of the present invention.

In the combustion chamber 20 according to a sixth embodiment of the present invention as shown in FIG. 13, the inner peripheral wall section 24 of the second volume 23 inclines and widens toward the bottom, and the sixth embodiment is different from the fourth embodiment in this point.

Also in the second to sixth embodiments of the present invention as described above, the objects of the present invention can be achieved with the same configuration as that in the first embodiment.

It is to be noted that the present invention is not limited to the embodiments described above, and also the embodiments including other configurations or the like allowing achievement of the objects of the present invention as described below are included within the scope of the present invention.

For instance, in the first embodiment, the former stage of fuel injection and the later stage of fuel injection are conceptually divided by the border section 20A of the combustion chamber 20 but are actually performed continuously, but in this invention, the first fuel injection may be defined as the former stage of fuel injection and the second fuel injection performed in a time space after the first fuel injection as the later stage of the fuel injection. Even when the pilot injection as described above is carried out, the objects of the present invention can be achieved by securely separating the first fuel injection to the second fuel injection under control by the control unit 30. The diesel engine 1 as described above corresponds to the invention according to claim 2.

Figure 14:
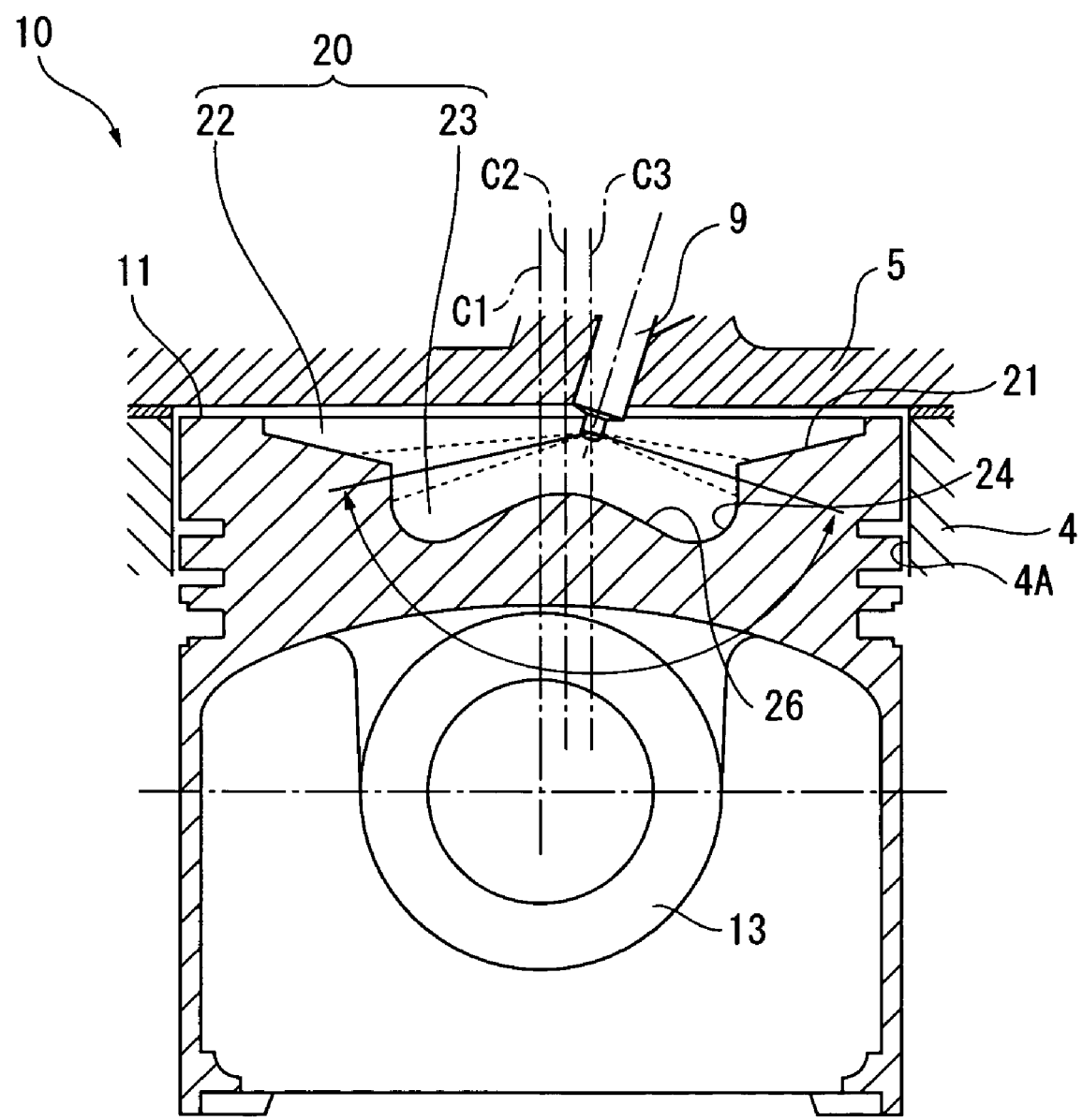
FIG. 14 is a side cross-sectional view showing other variant of the present invention.

In each of the embodiments described above, a center of the piston 10, a center of the combustion chamber 20, and an injecting position of the fuel injection nozzle 9 are identical to each other, but the present invention is applicable even to the configuration in which the center C2 of the combustion chamber 20 and the center C3 of the fuel injection nozzle 9 are offset (eccentric) from the center C1 of the piston 10 respectively as shown in FIG. 14. With the construction as described above, generally one inlet valve and one exhaust valve are provided.

In the first embodiment, the fuel injection timing is controlled according to the engine speed of and the engine load, but also the case in which the fuel injection timing is controlled according to only the engine speed or only the engine load is included within the scope of the present invention.

The best configurations and methods for carried out the present invention are disclosed above, but the present invention is not limited to the configurations and methods described above. Namely, the present invention is illustrated and described above mainly with specific embodiments, but those skilled in the art may add various modifications to the embodiments described above in forms and quantities as well as in other details without departing from a scope of the technological idea and objects of the present invention.

The forms, quantities and other specific descriptions disclosed above are provided only as examples for understanding of the present invention, and do not limit the present invention in any sense, and therefore descriptions removing a portion of or all of the forms, quantities, and other limitations described above are included within the scope of the present invention.

The priority application Number JP2003-401312 upon which this patent application is based is hereby incorporated by reference.

What is claimed is:

1. A direct injection diesel engine comprising:
a combustion chamber which is provided in a top face of a piston and which opens toward a cylinder head; and
a fuel injection nozzle provided in the cylinder head for injecting fuel toward said combustion chamber,
wherein said combustion chamber comprises:

a first volume, open toward the cylinder head, which has a circular periphery at said top face and is recessed from said top face toward a pin boss, and a second volume which is provided substantially at a center of the first volume and which is further recessed toward said pin boss than said first volume;

wherein the fuel injection from said fuel injection nozzle is continuously performed first into said second volume and then into said first volume in association with movement of said piston; and wherein during at least a portion of the engine operation, an injection period beginning at a start of the fuel injection and ending when the fuel injection reaches a border section between said first volume and said second volume is set to be in a range of 40% to 70% of a total fuel injection period by controlling a timing for start of the fuel injection in accordance with at least one of engine speed and engine load.

2. The direct injection diesel engine according to claim 1, wherein the a bottom surface of said first volume has an inclined surface which becomes gradually deeper toward the pin boss from a position near an external periphery section of said piston toward a center of said piston.

3. The direct injection diesel engine according to claim 1, wherein on a bottom surface of said second volume, a conical section is formed which has an inclined surface section which becomes gradually higher inwardly from the inner peripheral wall section toward said top face.

4. The direct injection diesel engine according to claim 1, wherein a ratio of an internal diameter of said second volume to an external diameter of said piston is in the a range from 0.4 to 0.6, and wherein a tire ratio of an internal diameter of said first volume to the internal diameter of said second volume is in tire a range from 1.3 to 2.0.

5. The direct injection diesel engine according to claim 1, wherein a radius of an edge formed at the border section between said first volume and said second volume is not more than 3% of an external diameter of said piston.

6. The direct injection diesel engine according to claim 2, wherein on a bottom surface of said second volume, a conical section is formed which has an inclined surface section which becomes gradually higher inwardly from the inner peripheral wall section toward said top face.

7. The direct injection diesel engine according to claim 2, wherein a ratio of an internal diameter of said second volume to an external diameter of said piston is in a range front 0.4 to 0.6, and wherein a ratio of an internal diameter of said first volume to the internal diameter of said second volume is in a range from 1.3 to 2.0.

8. The direct injection diesel engine according to claim 6, wherein a ratio of an internal diameter of said second volume to an external diameter of said piston is in a range from 0.4 to 0.6, and wherein a ratio of an internal diameter of said first volume to the internal diameter of said second volume is in a range from 1.3 to 2.0.

9. The direct injection diesel engine according to claim 2, wherein the a radius of an edge formed at the border section between said first volume and said second volume is not more than 3% of an external diameter of said piston.

10. The direct injection diesel engine according to claim 6, wherein a radius of an edge formed at the border section between said first volume and said second volume is not more than 3% of an external diameter of said piston.

11. The direct injection diesel engine according to claim 7, wherein a radius of an edge formed at the border section between said first volume and said second volume is not more than 3% of the external diameter of said piston.

12. The direct injection diesel engine according to claim 8, wherein a radius of an edge formed at the border section between said first volume and said second volume is not more than 3% of the external diameter of said piston.

13. The direct injection diesel engine according to claim 1, wherein a ratio of said injection period to the total fuel injection period is higher for higher engine loads than for lower engine loads.

* * * * *